United States Patent
Mataga et al.

(10) Patent No.: US 8,202,628 B2
(45) Date of Patent: Jun. 19, 2012

(54) FUSION-BONDED PRODUCT HAVING HIGH-STRENGTH PART AND MANUFACTURING METHOD THEREOF

(75) Inventors: Akira Mataga, Toyohashi (JP); Takashi Kuwanote, Aichi-ken (JP)

(73) Assignee: Musashi Seimitsu Kogyo Kabushiki Kaisha, Toyohashi-Shi, Aichi-Ken (JP)

( * ) Notice: Subject to any disclaimer, the term of this patent is extended or adjusted under 35 U.S.C. 154(b) by 837 days.

(21) Appl. No.: 11/952,226

(22) Filed: Dec. 7, 2007

(65) Prior Publication Data

US 2008/0138649 A1 Jun. 12, 2008

(30) Foreign Application Priority Data

Dec. 8, 2006 (JP) ................................. 2006-331629
Dec. 5, 2007 (JP) ................................. 2007-315069

(51) Int. Cl.
  *B32B 15/00* (2006.01)
  *F16H 48/00* (2012.01)
  *B23K 20/12* (2006.01)
(52) U.S. Cl. .......................... 428/683; 475/901; 228/113
(58) Field of Classification Search ........................ None
  See application file for complete search history.

(56) References Cited

U.S. PATENT DOCUMENTS

| | | | |
|---|---|---|---|
| 3,361,074 A * | 1/1968 | Eckerle | 418/168 |
| 3,803,892 A | 4/1974 | Yamaguchi et al. | |
| 4,059,214 A | 11/1977 | Weissmann | |
| 4,831,711 A | 5/1989 | Rapp | |
| 6,065,813 A * | 5/2000 | Fett et al. | 301/124.1 |
| 2005/0090358 A1* | 4/2005 | Phelan et al. | 475/231 |

FOREIGN PATENT DOCUMENTS

| | | |
|---|---|---|
| JP | 5-84614 | 4/1993 |
| JP | 2006-509172 | 3/2006 |
| WO | 2004/053357 | 6/2004 |

OTHER PUBLICATIONS

Merriman, Dictionary of Mettalurgy, 1958, MacDonald & Evens.*
Patent Abstracts of Japan of JP 5-84614 dated Apr. 6, 1993.

* cited by examiner

*Primary Examiner* — Jennifer McNeil
*Assistant Examiner* — Adam Krupicka
(74) *Attorney, Agent, or Firm* — Ladas & Parry LLP

(57) ABSTRACT

The present invention is a fusion-bonded product having a high-strength part, comprising: a first preform (2a) constituted by integrally, frictionally pressure-welding a first low-carbon steel part (L1) made of low-carbon steel containing less than 0.45% of C and a high-carbon steel part (H) made of high-carbon steel containing not less than 0.45% of C; and a second preform (2b) having a second low-carbon steel part (L2) made of second low-carbon steel containing less than 0.45% of C; wherein the high-carbon steel part (H) of the first preform (2a) is provided with a high-strength part (9) that has been previously formed into a desired shape and quenched, the second low-carbon steel part (L2) of the second preform (2b) has been previously formed into a predetermined shape, and the first low-carbon steel part (L1) of the first preform (2a) and the second low-carbon steel part (L2) of the second preform (2b) are bonded to each other by fusion welding.

20 Claims, 8 Drawing Sheets

| STRUCTURED STEEL | C | Si | Mn | P | S | Ni | Cr | Mo | Cu | V | Ceq | HCS |
|---|---|---|---|---|---|---|---|---|---|---|---|---|
| S 1 5 C | 0.16 | 0.18 | 0.72 | 0.017 | 0.024 | 0.04 | 0.11 | 0.01 | 0.13 | 0.00 | 0.313 | 2.217 |
| S 2 5 C | 0.26 | 0.18 | 0.72 | 0.017 | 0.024 | 0.04 | 0.11 | 0.01 | 0.13 | 0.00 | 0.413 | 3.603 |
| S 3 5 C | 0.36 | 0.18 | 0.72 | 0.017 | 0.024 | 0.04 | 0.11 | 0.01 | 0.13 | 0.00 | 0.513 | 4.989 |
| S 4 5 C | 0.46 | 0.18 | 0.72 | 0.017 | 0.024 | 0.04 | 0.11 | 0.01 | 0.13 | 0.00 | 0.613 | 6.375 |
| S 5 0 C | 0.51 | 0.18 | 0.72 | 0.017 | 0.024 | 0.04 | 0.11 | 0.01 | 0.13 | 0.00 | 0.663 | 7.067 |
| S 5 5 C | 0.55 | 0.18 | 0.72 | 0.017 | 0.024 | 0.04 | 0.11 | 0.01 | 0.13 | 0.00 | 0.703 | 7.622 |
| S C r 4 1 5 H | 0.14 | 0.20 | 0.84 | 0.012 | 0.017 | 0.04 | 1.19 | 0.01 | 0.10 | 0.00 | 0.529 | 0.955 |
| S C r 4 2 0 H | 0.17 | 0.20 | 0.84 | 0.012 | 0.017 | 0.04 | 1.19 | 0.01 | 0.10 | 0.00 | 0.559 | 1.160 |
| S CM 4 1 5 H | 0.15 | 0.25 | 0.73 | 0.012 | 0.017 | 0.04 | 1.05 | 0.20 | 0.10 | 0.00 | 0.495 | 1.264 |
| S CM 4 2 0 H | 0.20 | 0.25 | 0.73 | 0.012 | 0.017 | 0.04 | 1.05 | 0.20 | 0.10 | 0.00 | 0.545 | 1.685 |

Ceq: CARBON EQUIVALENT, HCS: HOT CRACK SENSITIVITY

FIG. 7

| AS A STRUCTURED STEEL FOR QUENCHING (H): |
|---|
| ○ : S45C、S50C、S55C、 |
| × : S15C、S25C、S35C、SCr415H、SCr420H、SCM415、SCM420 |

FIG.8

| AS A STRUCTURED STEELS FOR FUSION WELDING (L1,L2): |
|---|
| ◎ : S15C−S15C、S15C−S25C、S15C−SCr415H、S15C−SCr420H、S15C−SCM415、S15C−SCM420 S25C−SCr415H、S25C−SCr420H、S25C−SCM415、S25C−SCM420、 S35C−SCr415H、S35C−SCr420H、S35C−SCM415、S35C−SCM420、 SCr415H−SCr415H、SCr415H−SCr420H、SCr415H−SCM415、SCr415H−SCM420、 SCr420H−SCr420H、SCr420H−SCM415、SCr420H−SCM420、SCM415−SCM415、 SCM415−SCM420、SCM420−SCM420 |
| ○ : S15C−S35C、S25C−S25C、S25C−S35C、S35C−S35C |
| × : S45C−ANYONE, S50C−ANYONE, S55C−ANYONE |

FIG.9

FUSION-BONDED PRODUCT HAVING HIGH-STRENGTH PART AND MANUFACTURING METHOD THEREOF

CROSS REFERENCE TO RELATED APPLICATIONS

This application is based upon the prior Japanese Patent Application No. 2006-331629 filed on Dec. 8, 2006 and the prior Japanese Patent Application No. 2007-315069 filed on Dec. 5, 2007, the entire contents of which are incorporated herein by reference.

FIELD OF THE INVENTION

The present invention relates to a fusion-bonded product having a high-strength part, and a manufacturing method thereof.

BACKGROUND ART

Friction pressure welding has been conventionally known as an art for bonding two members of different shapes to form a bonded product. For example, JP5-84614A discloses that a first preform and a second preform, which are provided with tooth profiles formed by precision forging, are bonded by friction pressure welding, so that a composite gear having a tooth profile part is formed.

Laser welding has been known as another art for bonding two members of different shapes to form a bonded product. For example, JP2006-509172T discloses that a ring gear requiring a high strength and a differential case are laser-welded, so that a differential case having a tooth profile part is formed.

In the art disclosed in JP5-84614A, i.e., in the art for bonding by frictionally pressure-welding the first preform and the second preform, which are provided with the tooth profiles formed by precision forging, one of the first preform and the second preform is rotated at a high speed and pressure-welded to the other, so that an end of the first preform and an end of the second preform are fused by the frictional heat to thereby achieve bonding. Thus, in the bonded product that has been bonded by the friction pressure welding, the first preform and the second preform may be bonded with shaft centers thereof being misaligned, or an axial length of the bonded product may vary depending on a fusing condition of the end of the first preform and the end of the second preform. In this case, there is a problem in that a required precision cannot be obtained in the bonded product that has been bonded by the friction pressure welding. In order to accomplish the required precision in the bonded product that has been bonded by the friction pressure welding, the bonded product that has been bonded by the friction pressure welding has to be subjected to a machining process, which significantly increases a process cost.

On the other hand, in the art disclosed in JP2006-509172T, as particularly shown in the section 0017 and FIG. 1B of this document, a first differential case as the first preform and a second differential case having a ring gear as the second preform are bonded by laser welding, while the first and second differential cases are being respectively fixed, so that the differential case as a bonded product is formed. When the first differential case and the second differential case are welded while they are being fixed, if a shaft center of the first differential case and a shaft center of the second differential case are adjusted to be aligned during the fixing step, misalignment of the shaft centers does not occur whereby a required precision can be achieved in a resulting differential case formed by bonding the first and second differential cases.

However, since a ring gear requires a high strength, the ring gear is often made of high-carbon steel containing a larger amount of C (carbon) and quenched. In this case, when the second differential case made of high-carbon steel is subjected to fusion welding such as laser welding, there is a possibility that a bonded portion of high-carbon steel, which has been fused, hardens and cracks. Namely, a problem may occur in that a strength of the bonded portion where the first differential case and the second differential case are bonded is degraded.

SUMMARY OF THE INVENTION

The present invention has been made to solve the above problems. The object of the present invention is to provide a fusion-bonded product formed of a high-carbon steel part having a high-strength part and a low-carbon steel part, the fusion-bonded product being capable of realizing the high-strength part of a required precision, and of maintaining a required strength of a bonded portion. In addition, the object of the present invention is to provide a method of manufacturing the fusion-bonded product.

The present invention is a fusion-bonded product having a high-strength part, comprising: a first preform constituted by integrally, frictionally pressure-welding a first low-carbon steel part made of low-carbon steel containing less than 0.45% of C and a high-carbon steel part made of high-carbon steel containing not less than 0.45% of C; and a second preform having a second low-carbon steel part made of second low-carbon steel containing less than 0.45% of C; wherein the high-carbon steel part of the first preform is provided with a high-strength part that has been previously formed into a desired shape and quenched, the second low-carbon steel part of the second preform has been previously formed into a predetermined shape, and the first low-carbon steel part of the first preform and the second low-carbon steel part of the second preform are bonded to each other by fusion welding.

According to the present invention, a required strength can be obtained by quenching a quenchable part (to be the high-strength part) of the high-carbon steel part of the first preform. In addition, the first low-carbon steel part of the first preform and the second low-carbon steel part of the second preform are bonded by fusion welding. Thus, the high-carbon steel part does not fuse and harden at the bonded portion, whereby generation of a crack caused by the hardening of the bonded portion can be prevented. Namely, a required strength can be maintained at the bonded portion where the first preform and the second preform are bonded to each other. Further, since the fusion welding can be carried out under condition that the first preform and the second preform are fixed, it is easy to obtain a bonded product of a required precision. Moreover, a first material can be formed by frictionally pressure-welding a high-carbon steel containing not less than 0.45% of C and a low-carbon steel containing less than 0.45% of C, and thereafter the first material can be formed into a first preform of a predetermined shape. Thus, misalignment of shaft centers in the first material or variation of an axial length thereof, which may be caused by the friction pressure welding process, can be amended at the subsequent forming step.

For example, the high-strength part may have a tooth profile.

In addition, for example, the first preform may constitute a first differential case, the second preform may constitute a second differential case, and the first low-carbon steel part of the first preform and the second low-carbon steel part of the second preform may be bonded to each other by fusion welding to constitute a differential case. In this case, the number of bonding pieces such as bolts can be decreased, whereby weight reduction of the differential case can be realized.

The content of C in the high-carbon steel part is between 0.45% and 0.60%, for example. Further, the content of C in the first low-carbon steel part is between 0.10% and 0.40%, for example. Furthermore, the content of C in the second low-carbon steel part is also between 0.10% and 0.40%, for example.

In addition, the present invention is a method of manufacturing a fusion-bonded product having a high-strength part, the method comprising: forming an integral first material by frictionally pressure-welding a first preparatory material made of low-carbon steel containing less than 0.45% of C and a second preparatory material made of high-carbon steel containing not less than 0.45% of C; removing a burr on the first material, the burr having been caused by the friction-pressure welding; forming a first preform by forming a quenchable part of a predetermined shape in a region of the second preparatory material of the first material, and by forming a first low-carbon steel part of a predetermined shape in a region of the first preparatory material of the first material; quenching the quenchable part to form a high-strength part; forming a second preform having a second low-carbon steel part of a predetermined shape from a second material made of second low-carbon steel containing less than 0.45% of C; and bonding the first low-carbon steel part of the first preform and the second low-carbon steel part of the second preform by fusion welding.

According to the present invention, a required strength can be obtained by quenching the quenchable part (to be the high-strength part) of the high-carbon steel part of the first preform. In addition, the first low-carbon steel part of the first preform and the second low-carbon steel part of the second preform are bonded by fusion welding. Thus, the high-carbon steel part does not fuse and harden at the bonded portion, whereby generation of a crack caused by the hardening of the bonded portion can be prevented. Namely, a required strength can be maintained at the bonded portion where the first preform and the second preform are bonded to each other. Further, since the fusion welding can be carried out under condition that the first preform and the second preform are fixed, it is easy to obtain a bonded product of a required precision. Moreover, the first material is formed by frictionally pressure-welding the high-carbon steel containing not less than 0.45% of C (second preparatory material) and the low-carbon steel containing less than 0.45% of C (first preparatory material), and thereafter the first material is formed into the first preform of a predetermined shape. Thus, misalignment of shaft centers in the first material or variation of an axial length thereof, which may be caused by the friction pressure welding process, can be amended at the subsequent forming step.

For example, the quenchable part of a predetermined shape may be formed by forging. Further, the first low-carbon steel part of a predetermined shape may also be formed by forging. Furthermore, the second low-carbon steel part of a predetermined shape may also be formed by forging. In these cases, yield of the first material and/or the second material can be improved. In addition, misalignment of shaft centers in the first material and variation of an axial length thereof, which may be caused by the friction pressure welding process, can be amended at the forging step. Thus, a process cost (manufacturing cost) can be reduced.

The above consideration is mainly given to carbon steels, whose characteristics are mostly determined by an amount of C (carbon). The inventors of the present invention further studied other structured steels, whose characteristics may be affected by an amount of any other component than C (carbon). As a result, the inventors have found that Carbon Equivalent, instead of the amount of C, should be used as the standard for such structured steels.

The Carbon Equivalent is defined as follows in JIS (Japanese Industrial Standards).

$$\text{Carbon Equivalent (Ceq)} = C + Mn/6 + Si/24 + Ni/40 + Cr/5 + Mo/4 + V/14$$

Herein, C is the amount of carbon (%), Mn is the amount of manganese (%), Si is the amount of silicon (%), Ni is the amount of nickel (%), Cr is the amount of chromium (%), Mo is the amount of molybdenum (%), and V is the amount of vanadium (%).

Then, the threshold "0.45%" of the amount of carbon, which was firstly found by the inventors, can be converted into "0.60%" of the Carbon Equivalent in case of the general carbon steels (for example, S45C), by using the component data thereof (An example of component data of S45C: C=0.46, Mn=0.72, Si=0.18, Ni=0.04, Cr=0.11, V=0.00: the amount of C=0.46%, Carbon Equivalent=0.61%). The inventors have confirmed that such conversion (replacement) is actually applicable to the present invention for not only the general carbon steels but also the other structured steels.

That is, the present invention is a fusion-bonded product having a high-strength part, comprising: a first preform constituted by integrally, frictionally pressure-welding a first steel part made of a structured steel containing less than 0.60% of Carbon Equivalent and a quenchable steel part made of another structured steel containing not less than 0.60% of Carbon Equivalent; and a second preform having a second steel part made of a structured steel containing less than 0.60% of Carbon Equivalent; wherein the quenchable steel part of the first preform is provided with a high-strength part that has been previously formed into a desired shape and quenched, the second steel part of the second preform has been previously formed into a predetermined shape, and the first steel part of the first preform and the second steel part of the second preform are bonded to each other by fusion welding.

According to the present invention, a required strength can be obtained by quenching a quenchable part (to be the high-strength part) of the quenchable steel part of the first preform. In addition, the first steel part of the first preform and the second steel part of the second preform are bonded by fusion welding. Thus, the quenchable steel part does not fuse and harden at the bonded portion, whereby generation of a crack caused by the hardening of the bonded portion can be prevented. Namely, a required strength can be maintained at the bonded portion where the first preform and the second preform are bonded to each other. Further, since the fusion welding can be carried out under condition that the first preform and the second preform are fixed, it is easy to obtain a bonded product of a required precision. Moreover, a first material can be formed by frictionally pressure-welding a quenchable steel containing not less than 0.60% of Carbon Equivalent and a first steel containing less than 0.60% of Carbon Equivalent, and thereafter the first material can be formed into a first preform of a predetermined shape. Thus, misalignment of shaft centers in the first material or variation of an axial length thereof, which may be caused by the friction pressure welding process, can be amended at the subsequent forming step.

In the case too, for example, the high-strength part may have a tooth profile.

In addition, in the case too, for example, the first preform may constitute a first differential case, the second preform may constitute a second differential case, and the first steel part of the first preform and the second steel part of the second preform may be bonded to each other by fusion welding to constitute a differential case. In this case, the number of bonding pieces such as bolts can be decreased, whereby weight reduction of the differential case can be realized.

Furthermore, if the sum of a value of Hot Crack Sensitivity of the first steel part and a value of Hot Crack Sensitivity of the second steel part is less than 7.0, generation of a crack may be prevented more surely. The value of Hot Crack Sensitivity is calculated in accordance with the following expression.

Hot Crack Sensitivity (HCS)=1000×C(S+P+Si/25+Ni/ 100)/(3Mn+Cr+Mo+V)

Herein, C is the amount of carbon (%), S is the amount of sulfur (%), P is the amount of phosphorus (%), Si is the amount of silicon (%), Ni is the amount of nickel (%), Mn is the amount of manganese (%), Cr is the amount of chromium (%), Mo is the amount of molybdenum (%), and V is the amount of vanadium (%).

In addition, the present invention is a method of manufacturing a fusion-bonded product having a high-strength part, the method comprising: forming an integral first material by frictionally pressure-welding a first preparatory material made of a structured steel containing less than 0.60% of Carbon Equivalent and a second preparatory material made of another structured steel containing not less than 0.60% of Carbon Equivalent; removing a burr on the first material, the burr having been caused by the friction-pressure welding; forming a first preform by forming a quenchable part of a predetermined shape in a region of the second preparatory material of the first material, and by forming a first steel part of a predetermined shape in a region of the first preparatory material of the first material; quenching the quenchable part to form a high-strength part; forming a second preform having a second steel part of a predetermined shape from a second material made of a second structured steel containing less than 0.60% of Carbon Equivalent; and bonding the first steel part of the first preform and the second steel part of the second preform by fusion welding.

According to the present invention, a required strength can be obtained by quenching the quenchable part (to be the high-strength part) of the second preparatory material. In addition, the first steel part of the first preform and the second steel part of the second preform are bonded by fusion welding. Thus, the second preparatory material does not fuse and harden at the bonded portion, whereby generation of a crack caused by the hardening of the bonded portion can be prevented. Namely, a required strength can be maintained at the bonded portion where the first preform and the second preform are bonded to each other. Further, since the fusion welding can be carried out under condition that the first preform and the second preform are fixed, it is easy to obtain a bonded product of a required precision. Moreover, the first material is formed by frictionally pressure-welding the second preparatory material containing not less than 0.60% of Carbon Equivalent and the first preparatory material containing less than 0.60% of Carbon Equivalent, and thereafter the first material is formed into the first preform of a predetermined shape. Thus, misalignment of shaft centers in the first material or variation of an axial length thereof, which may be caused by the friction pressure welding process, can be amended at the subsequent forming step.

In the case too, for example, the quenchable part of a predetermined shape may be formed by forging. Further, the first steel part of a predetermined shape may also be formed by forging. Furthermore, the second steel part of a predetermined shape may also be formed by forging. In these cases, yield of the first material and/or the second material can be improved. In addition, misalignment of shaft centers in the first material and variation of an axial length thereof, which may be caused by the friction pressure welding process, can be amended at the forging step. Thus, a process cost (manufacturing cost) can be reduced.

In addition, in the case too, if the sum of a value of Hot Crack Sensitivity of the first steel part and a value of Hot Crack Sensitivity of the second steel part is less than 7.0, generation of a crack may be prevented more surely.

BRIEF DESCRIPTION OF THE DRAWINGS

FIG. 7 shows a data table of structured steels including general carbon steels;

FIG. 8 shows a result of evaluation as a structured steel for quenching, regarding the structured steels shown in FIG. 7; and FIG. 9 shows a result of evaluation as structured steels for fusion welding, regarding the structured steels shown in FIG. 7.

BEST MODE FOR CARRYING OUT THE INVENTION

Figure 1:
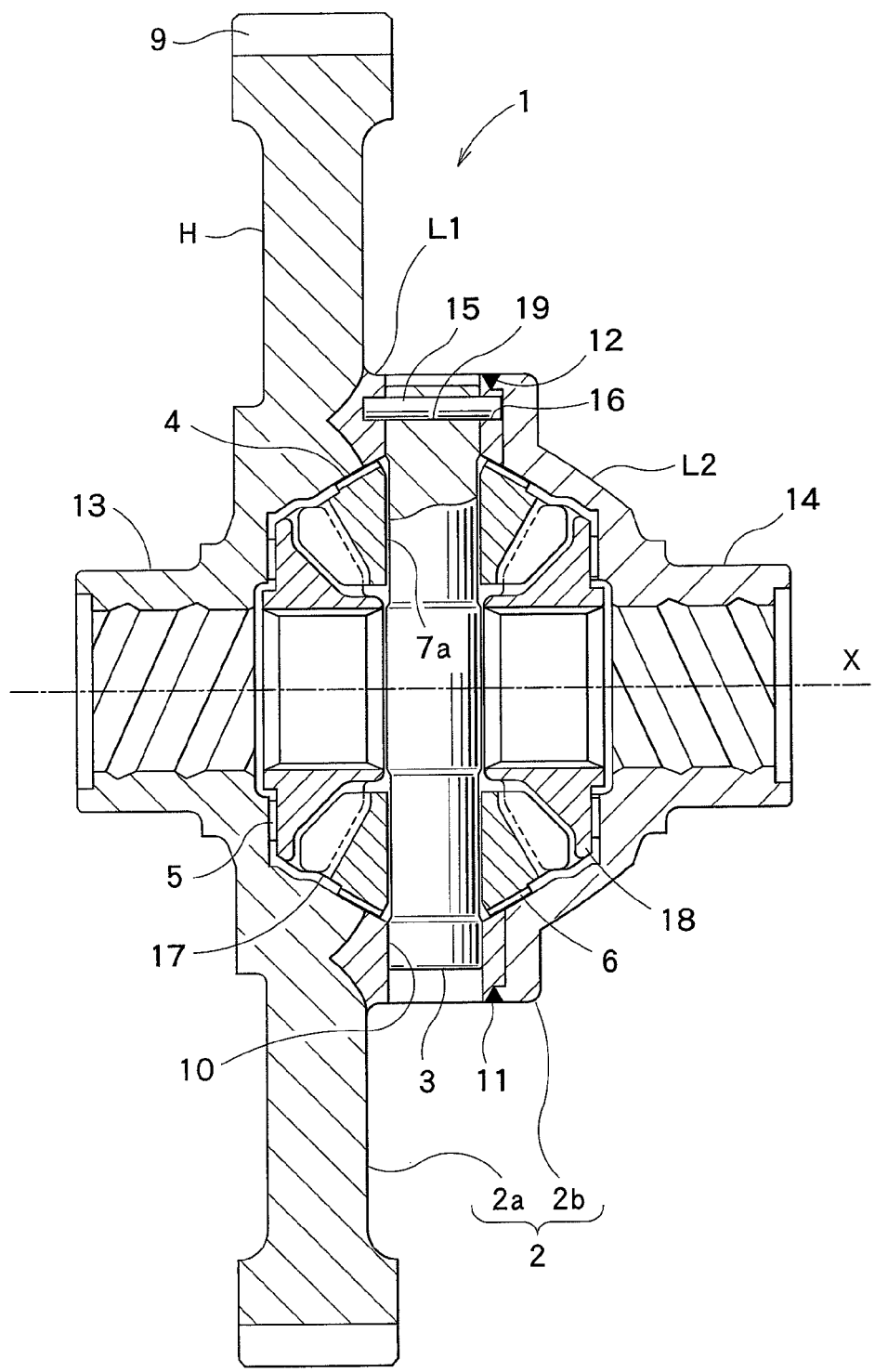
FIG. 1 is a sectional view of a differential case of a differential gear as a fusion-bonded product according to one embodiment of the present invention.
Figure 2A:
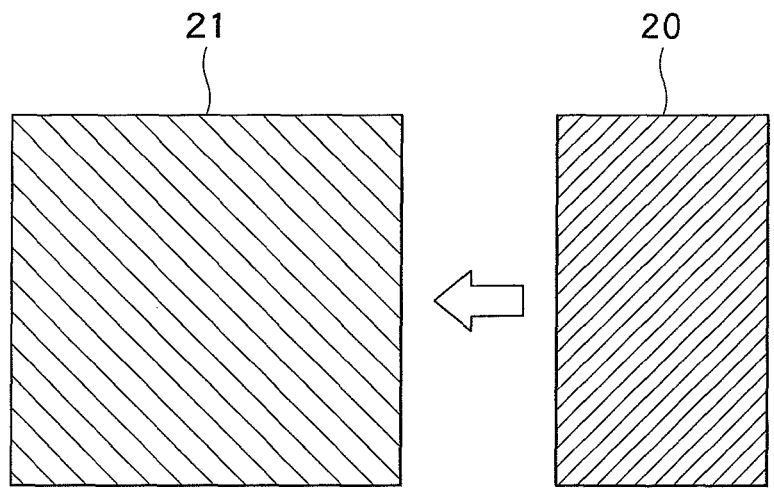
FIGS. 2A and 2B are sectional views for explaining a forming step of a first material, in a manufacturing method according to one embodiment of the present invention.
Figure 2B:
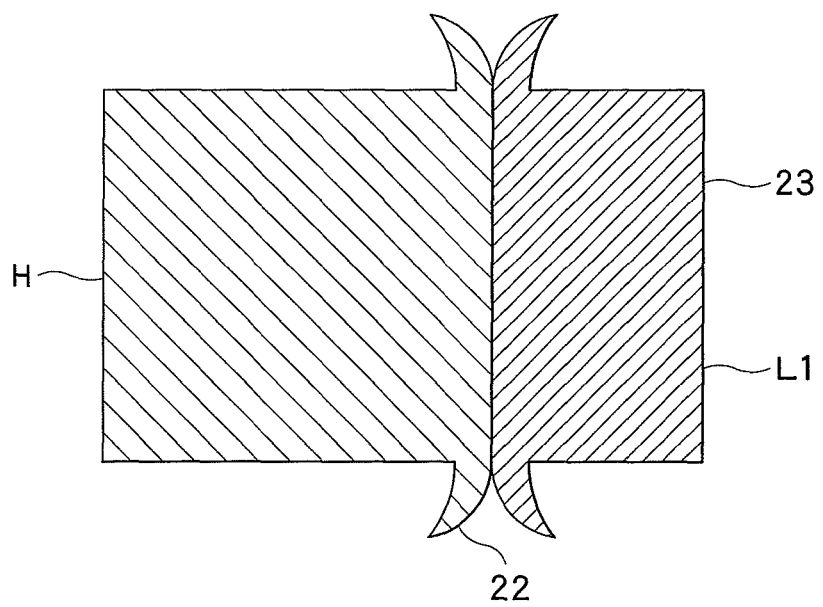
Figure 3A:
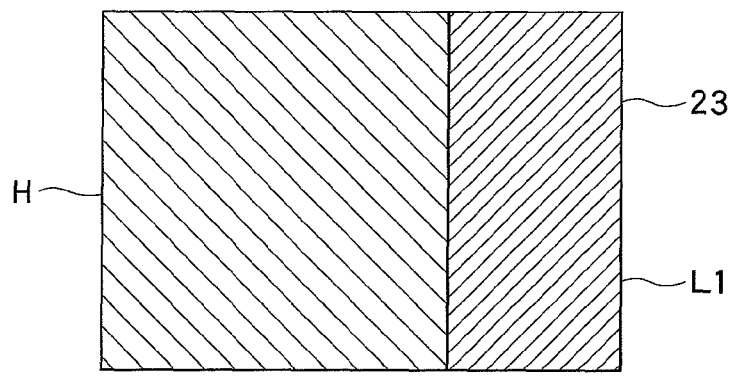
FIGS. 3A and 3B are sectional views for explaining a forming step of a first differential case from the first material, in the manufacturing method according to one embodiment of the present invention.
Figure 3B:
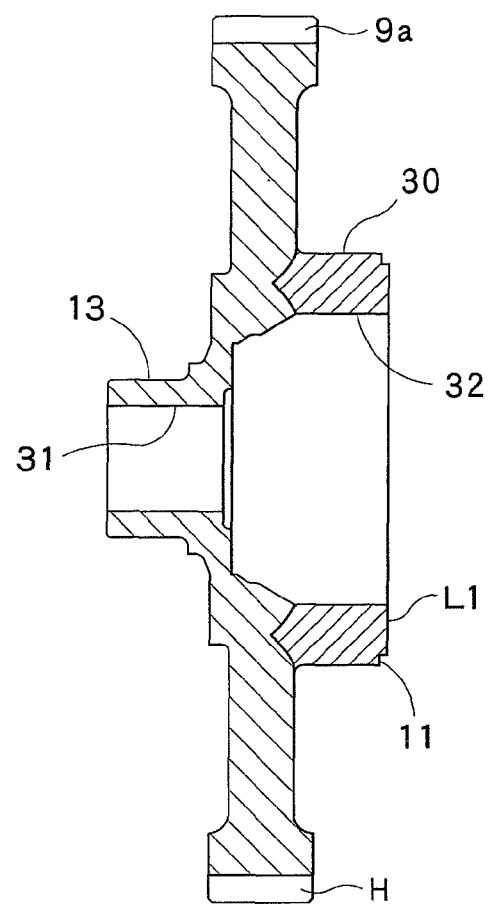
Figure 4:
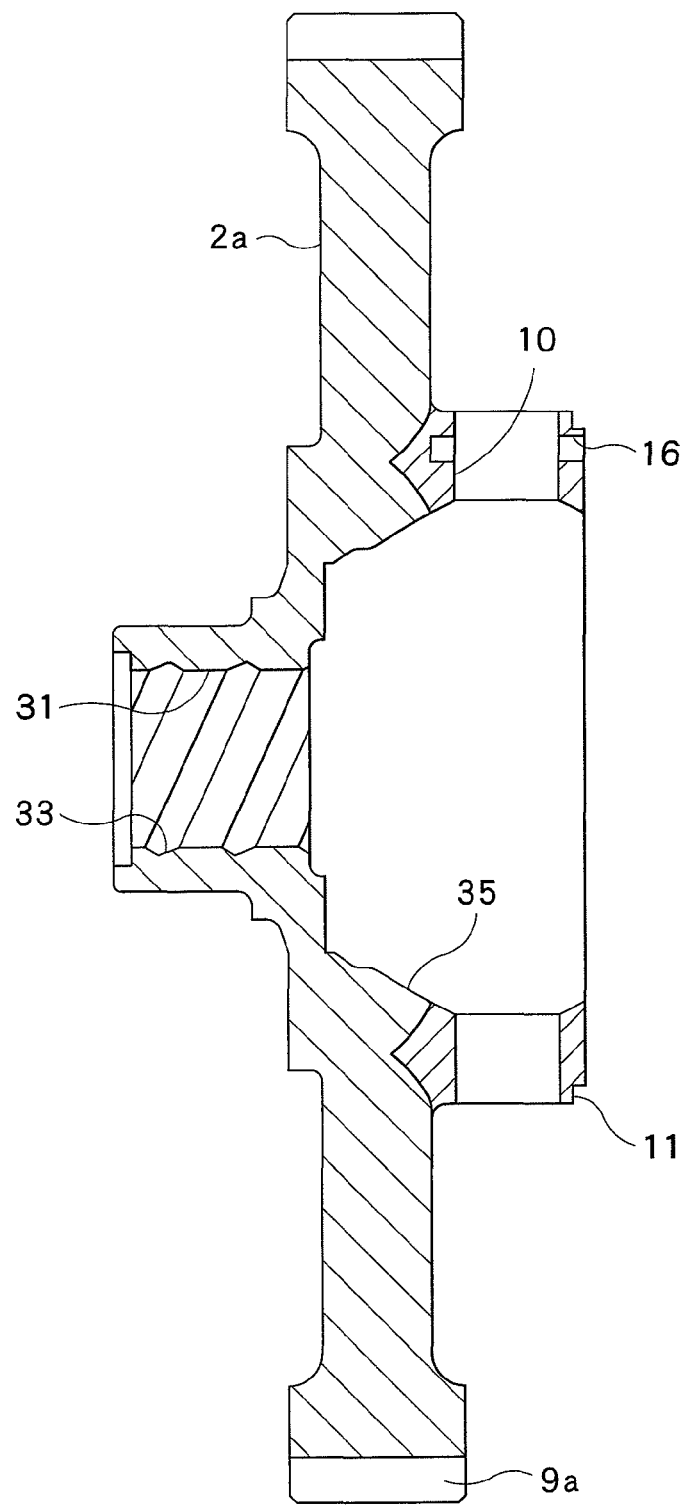
FIG. 4 is a sectional view of a first preform in the fusion-bonded product according to one embodiment of the present invention.
Figure 5A:
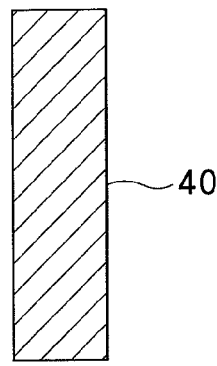
FIGS. 5A to 5C are sectional views for explaining a forming step of a second preform from a second material, in the manufacturing method according to one embodiment of the present invention.
Figure 5B:
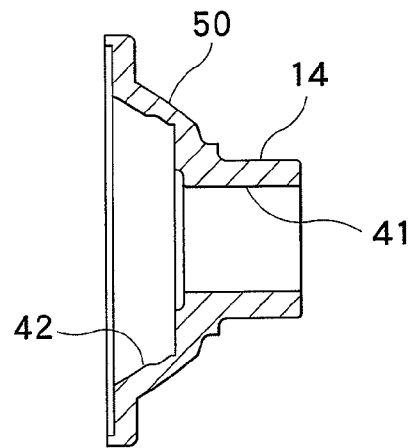
Figure 5C:
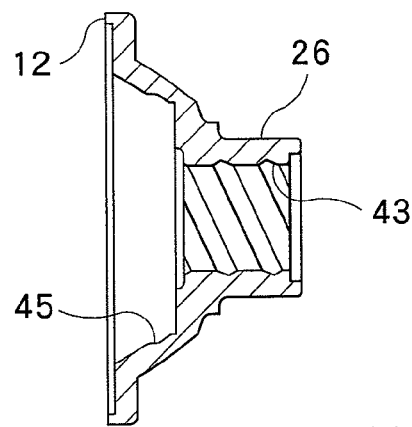
Figure 6:
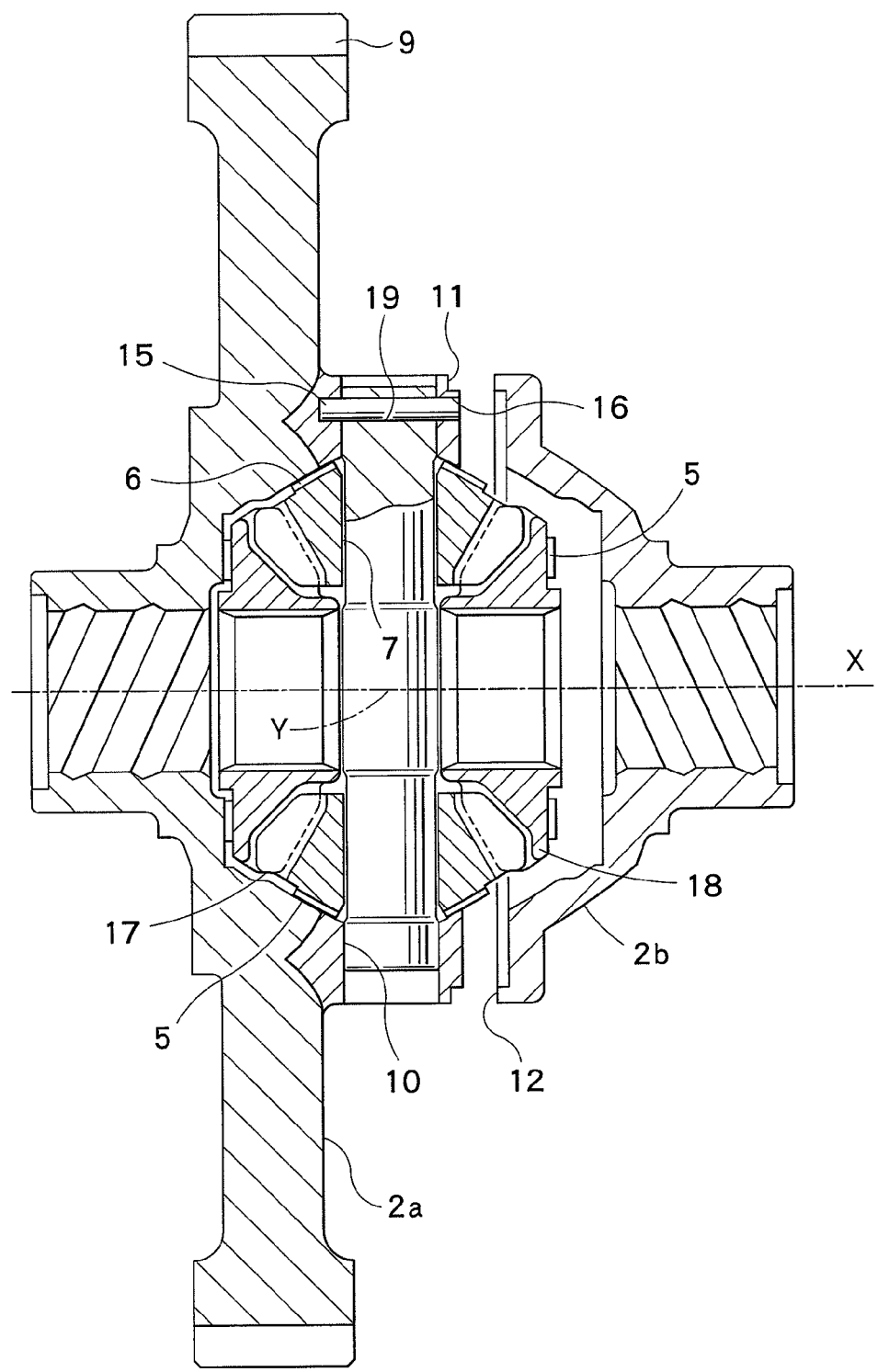
FIG. 6 is a sectional view of the differential case, which is not yet welded, of the differential gear as the fusion-bonded product according to one embodiment of the present invention.

FIG. 1 is a sectional view of a differential case of a differential gear as a fusion-bonded product in one embodiment of the present invention. FIGS. 2A and 2B are sectional views illustrating a forming step of a first material, in a manufacturing method in one embodiment of the present invention. FIGS. 3A and 3B are sectional views illustrating a forming step of forming a first differential case from the first material, in the manufacturing method in one embodiment of the present invention. FIG. 4 is a sectional view of a first preform in the fusion-bonded product in one embodiment of the present invention. FIGS. 5A to 5C are sectional views illustrating a forming step of forming a second preform from a second material, in the manufacturing method in one embodiment of the present invention. FIG. 6 is a sectional view of the differential case, which is not yet welded, of the differential gear as the fusion-bonded product in one embodiment of the present invention.

At first, a differential gear 1 is described with reference to FIG. 1. A differential case 2 of the differential gear 1 as a fusion-bonded product in one embodiment of the present invention is composed of a first differential case 2a as a first preform, and a second differential case 2b as a second preform. The first differential case 2a includes a high-carbon steel part H containing not less than 0.45% of C, the high-carbon steel part H having a first boss part 13 extending in an axle direction, and a first low-carbon steel part L1 containing less than 0.45% of C. The second differential case 2b includes a second low-carbon steel part L2 containing less than 0.45% of C and having a second boss part 14 extending in the axle direction.

The content of C in the high-carbon steel part H is between 0.45% and 0.60%, for example. The content of C in the first low-carbon steel part L1 is between 0.10% and 0.40%, for example. The content of C in the second low-carbon steel part L2 is also between 0.10% and 0.40%, for example.

A tooth profile 9 which has to be a high-strength part is formed by quenching in the high-carbon steel part H of the first differential case 2a. In the first low-carbon steel part L1 of the first differential case 2a, there are formed: a differential-case hole 10 through which a pinion shaft 3, which is described below, is inserted into the first differential case 2a; a steady-pin insertion hole 16 through which a steady pin 15, which is described below, is inserted into the first differential case 2a; and a fitting dent 11. A fitting projection 12 is formed in the second low-carbon steel part L2 of the second differential case 2b. The fitting dent 11 and the fitting projection 12 are bonded to each other by any one of electron beam welding, laser welding, and resistance welding. Thus, the differential case 2 is formed.

Arranged in the differential case 2 are: the pinion shaft 3 that is rotated together with the differential case 2; the steady pin 15 for fixing the pinion shaft 3 to the differential case 2; pinion gears 6 that are rotatably supported by the pinion shaft 3 inserted in the differential-case hole 10; thrust washers 4 for a pinion gear, disposed between the pinion gear 6 and the differential case 2; a first side gear 17 and a second side gear 18 which are meshed with the pinion gears 6; and thrust washers 5 for a side gear, disposed between the first and second side gears 17 and 18 and the differential case 2.

Next, a method of forming the first differential gear 2a is described with reference to FIGS. 2A to 4.

As shown in FIG. 2A, there are prepared a first preparatory material 20 made of low-carbon steel containing less than 0.45% of C, and a second preparatory material 21 made of high-carbon steel containing not less than 0.45% of C. Then, the first preparatory material 20 and the second preparatory material 21 are mounted on a friction-pressure-welding apparatus, not shown, and the first preparatory material 20 is frictionally pressure-welded to the second preparatory material 21, while only the first preparatory material 20 is being rotated at a high speed. Thus, as shown in FIG. 2B, the first preparatory material 20 and the second preparatory material 21 are bonded to each other, and a first material 23 having a burr 22 around the bonded portion is formed.

Then, the burr on the first material 23 is removed. Thus, as shown in FIG. 3A, there is formed the first material 23 having the high-carbon steel part H containing not less than 0.45% of C, and the first low-carbon steel part L1 containing less than 0.45% of C. In this friction pressure welding process, the first preparatory material 20 and the second preparatory material 21 are softened and bonded to each other. Thus, generation of a blow hole in the bonded portion and generation of a crack in the bonded portion, which is caused by a hardening thereof, can be prevented. Namely, the high-carbon steel part H and the first low-carbon steel part L1 are securely, integrally bonded to each other to form the first material 23.

The first material 23 is plastically deformed by hot forging in such a manner that the quenchable part 9a with the tooth profile, the first boss part 13, and a first through-hole 31 inside the first boss part 13 are formed in a region of the high-carbon steel part H containing not less than 0.45% of C. Then, a first preparatory gear chamber 32 is formed inside the high-carbon steel part H and the low-carbon steel part L1. Then, the circumferential fitting dent 11 is formed in an outer circumferential end of the low-carbon steel part L1. Thus, a preparatory first differential case 30 is completed.

As shown in FIG. 4, the first through-hole 31 of the preparatory first differential case 30 is subjected to a bore finishing, and a first lubricating groove 33 is formed by machining. An inside of the first preparatory gear chamber 32 is machined to correspond to shapes of one thrust washer 4 for a pinion gear and one thrust washer 5 for a side gear, which are brought into contact with first preparatory gear chamber 32, whereby a first gear chamber 35 is formed. Further, the differential-case hole 10 is formed by machining between an outer circumference of the preparatory first differential case 30 and the first gear chamber 35. The steady-pin insertion hole 16 is formed by machining such that the steady-pin insertion hole 16 is perpendicular to the differential-case hole 10. In addition, the quenchable part 9a with the tooth profile is formed into a required shape by machining. Then, only the tooth profile part is subjected to induction quenching, and there is completed the first differential case 2a having the tooth profile 9 of a required shape and hardness.

Next, a method of forming the second differential case 2b is described with reference to FIGS. 5A to 5C. At first, as shown in FIG. 5A, a second material 40 made of low-carbon steel containing less than 0.45% of C is prepared. Then, as shown in FIG. 5B, by hot forging, the second boss part 14 is formed outside, a second through-hole 41 and a second preparatory gear chamber 42 are formed inside, and the circumferential fitting projection 12 to be fitted in the fitting dent 11 of the preparatory first differential case 30 is formed on an outer circumferential end. Thus, a preparatory second differential case 50 is completed.

Then, as shown in FIG. 5C, an inside of the second preparatory gear chamber 42 is machined to correspond to shapes of the other thrust washer 4 for a pinion gear and the other thrust washer 5 for a side gear, which are brought into contact with the second preparatory gear chamber 42, whereby a second gear chamber 45 is formed. In addition, the second through-hole 41 is subjected to a bore finishing, and a second lubricating groove 43 is formed by machining. Thus, the second differential case 2b is completed.

Next, a method of assembling the differential gear 1 is described with reference to FIG. 6.

At first, in the first differential case 2a, the first side gear 17 in which one thrust washer 5 for a side gear has been attached on a side away from a tooth profile thereof is placed on a rotational axis X of the differential case 2 such that a tooth-profile side of the first side gear 17 faces a center Y of the differential case 2.

Then, two pinion gears 6, in each of which one thrust washer 4 for a pinion gear has been attached on a side away from a tooth profile thereof, are placed on the first side gear 17. At this time, the tooth profiles of the respective pinion gears 6 face the rotational axis X of the differential case 2, and are opposed to each other over the rotational axis X of the differential case 2. Then, pinion gear holes 7 of the pinion gears 6, the differential-case hole 10 of the first differential case 2a, and holes of the thrust washers 4 for a pinion gear are aligned to each other.

Thereafter, the pinion shaft 3 is inserted through the differential-case hole 10, the hole of one thrust washer 4 for a pinion gear, and the pinion gear hole 7 formed in one pinion gear 6, to reach the rotational axis X of the differential case 2. Then, the pinion shaft 3 is guided to the other pinion gear hole 7, the hole of the other thrust washer 4 for a pinion gear, and the differential-case hole 10, which are symmetrical with respect to the rotational axis X. Subsequently, the pinion gears 6 are positioned in the first differential case 2a. Following thereto, the steady pin 15 is inserted into the steady-pin insertion hole 16 of the first differential case 2a and a steady-pin insertion hole 19 of the pinion shaft 3. Thus, the pinion gears 6 are disengageably assembled to the first differential case 2a.

After that, the second side gear 18 in which the other thrust washer 5 for a side gear has been attached to a side away from a tooth profile thereof is placed on the pinion gears 6. At this time, the second side gear 18 is placed on the pinion gears 6 such that the tooth profile of the second side gear 18 faces the pinion gears 6.

Then, the fitting projection 12 of the second differential case 2b and the fitting dent 11 of the first differential case 2a are fitted to each other. Thereafter, the fitting dent 11 of the first low-carbon steel part L1 and the fitting projection 12 of the second low-carbon steel part L2 are fusion-bonded by electron beam welding, so that assembling of the differential case 2 of the differential gear 1 is completed.

According to the above differential case 2, a required strength can be obtained by quenching the tooth profile part 9 of the high-carbon steel part H of the first differential case 2a. In addition, the first low-carbon steel part L1 of the first differential case 2a and the second low-carbon steel part L2 of the second differential case 2b are bonded by electron beam welding. Thus, the high-carbon steel part H does not fuse and harden at the bonded portion, whereby there is no possibility that the bonded portion hardens to generate a crack. Namely, a required strength can be obtained at the bonded portion where the first differential case 2a and the second differential case 2b are bonded to each other. Further, since the electron beam welding can be carried out under condition that the first differential case 2a and the second differential case 2b are fixed, it is easy to obtain a bonded product of a required precision. Moreover, the first material 23 is formed by frictionally pressure-welding the high-carbon steel containing not less than 0.45% of C and the low-carbon steel containing less than 0.45% of C, and thereafter the first material 23 is formed into the first differential case 2a of a predetermined shape. Thus, misalignment of shaft centers in the first material 23 and variation of an axial length thereof, which may be caused by the friction pressure welding process, can be amended at the subsequent forming step.

In addition, since the first differential case 2a and the second differential case 2b are bonded by welding, the number of bonding pieces such as bolts can be decreased. Thus, weight reduction of the differential case 2 can be realized.

When forming of the quenchable part 9a with the tooth profile, forming of the first differential case 2a, and forming of the second differential case 2b are performed by forging, yields of the first differential case 2a and the second differential case 2b can be improved, as compared with a case in which these members are formed by machining. Further, since misalignment of shaft centers in the first material 23 and variation of an axial length thereof, which may be caused by the friction pressure welding process, can be amended at the forging step, a process cost needed for achieving a required dimension precision can be reduced.

In the above embodiment, although the tooth profile part 9 is formed as a high-strength part 9, another part requiring a high strength may be formed into a different shape. Moreover, in addition to the hot forging, forming (shaping) of the first differential case 2a and forming (shaping) of the second differential case 2b after the friction pressure welding step may be performed by cold forging, warm forging, or machining.

In the above embodiment, although the differential case 2 has been described, the present invention may be applied to another bonded product. In addition, although electron beam welding is given as an example for fusing and bonding the first differential case 2a and the second differential case 2b, another fusion welding, such as laser welding and resistance welding, may be used.

In addition, although positioning upon welding is carried out by means of the fitting dent 11 formed in the first differential case 2a and the fitting projection 12 formed on the second differential case 2b, positioning upon welding may be carried out by means of a fitting projection formed on the first differential case 2a and a fitting dent formed in the second differential case 2b.

In addition, although the second differential case 2b is made only of the second low-carbon steel part L2, the second differential case 2b may have a high-carbon steel part, as long as a portion to be fused and welded is made of a low-carbon steel part.

In addition, although the induction quenching is adopted in the above embodiment, the carburizing quenching may be adopted to enhance the strength more.

The above explanation is mainly given to carbon steels, whose characteristics are mostly determined by an amount of C (carbon). The inventors of the present invention further studied other structured steels, whose characteristics may be affected by an amount of any other component than C (carbon). As a result, the inventors have found that Carbon Equivalent, instead of the amount of C, should be used as the standard for such structured steels.

The Carbon Equivalent is defined as follows in JIS (Japanese Industrial Standards).

$$\text{Carbon Equivalent (Ceq)}=C+Mn/6+Si/24+Ni/40+Cr/5+Mo/4+V/14$$

Herein, C is the amount of carbon (%), Mn is the amount of manganese (%), Si is the amount of silicon (%), Ni is the amount of nickel (%), Cr is the amount of chromium (%), Mo is the amount of molybdenum (%), and V is the amount of vanadium (%).

Then, the threshold "0.45%" of the amount of carbon, which was firstly found by the inventors, can be converted into "0.60%" of the Carbon Equivalent in case of the general carbon steels (for example, S45C), by using the component data thereof (An example of component data of S45C: C=0.46, Mn=0.72, Si=0.18, Ni=0.04, Cr=0.11, V=0.00: the amount of C=0.46%, Carbon Equivalent=0.61%). The inventors have confirmed that such conversion (replacement) is actually applicable to the present invention for not only the general carbon steels but also the other structured steels.

That is, as contrast with the above embodiment, in stead of the high-carbon steel part H, a structured steel containing not less than 0.60% of Carbon Equivalent (a quenchable steel) may be used; in stead of the first low-carbon steel part L1, a first steel part made of a structured steel containing less than 0.60% of Carbon Equivalent; and in stead of the second low-carbon steel part L2, a second steel part made of a structured steel containing less than 0.60% of Carbon Equivalent.

In the case too, a required strength can be obtained by quenching the quenchable part 9a with the tooth profile of the quenchable steel part H of the first differential case 2a. In addition, the first steel part L1 of the first differential case 2a and the second steel part L2 of the second differential case 2b are bonded by electron beam welding. Thus, the quenchable steel part H does not fuse and harden at the bonded portion, whereby there is no possibility that the bonded portion hardens to generate a crack. Namely, a required strength can be obtained at the bonded portion where the first differential case 2a and the second differential case 2b are bonded to each other. Further, since the electron beam welding can be carried out under condition that the first differential case 2a and the second differential case 2b are fixed, it is easy to obtain a bonded product of a required precision. Moreover, the first material 23 is formed by frictionally pressure-welding the quenchable steel part H containing not less than 0.60% of Carbon Equivalent and the first steel part containing less than 0.60% of Carbon Equivalent, and thereafter the first material 23 is formed into the first differential case 2a of a predetermined shape. Thus, misalignment of shaft centers in the first material 23 and variation of an axial length thereof, which may be caused by the friction pressure welding process, can be amended at the subsequent forming step.

Furthermore, when the first steel part L1 of the first preform and the second steel part L2 of the second preform are bonded by fusion welding, if the sum of a value of Hot Crack Sensitivity of the first steel part and a value of Hot Crack Sensitivity of the second steel part is less than 7.0, generation of a crack may be prevented more surely. The value of Hot Crack Sensitivity is calculated in accordance with the following expression.

$$\text{Hot Crack Sensitivity (HCS)} = 1000 \times C(S+P+Si/25+Ni/100)/(3Mn+Cr+Mo+V)$$

Herein, C is the amount of carbon (%), S is the amount of sulfur (%), P is the amount of phosphorus (%), Si is the amount of silicon (%), Ni is the amount of nickel (%), Mn is the amount of manganese (%), Cr is the amount of chromium (%), Mo is the amount of molybdenum (%), and V is the amount of vanadium (%).

FIG. 7 shows a data table of structured steels including general carbon steels. In the table, Ceq means the Carbon Equivalent, and ECS means the Hot Crack Sensitivity. FIG. 8 shows a result of evaluation as a structured steel for quenching H, regarding the structured steels shown in FIG. 7. FIG. 9 shows a result of evaluation as structured steels for fusion welding L1, L2, regarding the structured steels shown in FIG. 7.

As shown in FIG. 8, as a structured steel for quenching H, S45C, S50C and S55C were preferable, especially in view of the strength for the tooth profile part 9. The other structured steels were not preferable because they couldn't achieve a desired strength for the tooth profile part.

On the other hand, as shown in FIG. 9, in the evaluation as structured steels for fusion welding L1, L2, "0.45%" of the amount of carbon and "0.60%" of the Carbon Equivalent were threshold of the eligibility. In addition, when the sum of values of Hot Crack Sensitivity of two structured steels to be fusion welded is less than 7.0, it was actually confirmed that generation of a crack may be prevented more surely.

It is needless to say that workability is also taken into consideration in selecting structured steel(s). Some structured steels may not be used if they have poor workability.

The invention claimed is:

1. A fusion-bonded product having a high-strength part, comprising:
    a first preform (2a) constituted by (a) integrally, frictionally pressure-welding a first low-carbon steel part (L1) made of low-carbon steel containing less than 0.45% of C and a high-carbon steel part (H) made of high-carbon steel containing not less than 0.45% C, and (b) deforming the first preform by forging such that a border between the first low-carbon steel part (L1) and the high-carbon steel part (H) comprises a V-shaped peak in cross section; and
    a second preform (2b) having a second low-carbon steel part (L2) made of second low-carbon steel containing less than 0.45% of C;
    wherein the high-carbon steel part (H) of the first preform (2a) is provided with a high-strength part (9) that has been previously formed into a desired shape and quenched,
    the second low-carbon steel part (L2) of the second preform (2b) has been previously formed into a predetermined shape,
    the first low-carbon steel part (L1) of the first preform (2a) and the second low-carbon steel part (L2) of the second preform (2b) are bonded to each other by fusion welding, and
    the high-carbon steel part (H) of the first preform is spaced from the second low-carbon steel part (L2) of the second preform with the first low-carbon steel part (L1) of the first preform disposed therebetween.

2. The fusion-bonded product having a high-strength part according to claim 1, wherein
    the high-strength part (9) has a tooth profile.

3. The fusion-bonded product having a high-strength part according to claim 2, wherein
    the first preform (2a) constitutes a first differential case,
    the second preform (2b) constitutes a second differential case, and
    the first low-carbon steel part (L1) of the first preform (2a) and the second low-carbon steel part (L2) of the second preform (2b) are bonded to each other by fusion welding to constitute a differential case (2).

4. The fusion-bonded product having a high-strength part according to claim 1, wherein
    the content of C in the high-carbon steel part (H) is between 0.45% and 0.60%.

5. The fusion-bonded product having a high-strength part according to claim 4, wherein
    the content of C in the first low-carbon steel part (L1) is between 0.10% and 0.40%.

6. The fusion-bonded product having a high-strength part according to claim 5, wherein
    the content of C in the second low-carbon steel part (L2) is also between 0.10% and 0.40%.

7. A method of manufacturing the fusion-bonded product according to claim 1, the method comprising:
    forming an integral first material (23) by frictionally pressure-welding a first preparatory material (20) made of low-carbon steel containing less than 0.45% of C and a second preparatory material (21) made of high-carbon steel containing not less than 0.45% of C;
    removing a burr (22) on the first material (23), the burr having been caused by the friction-pressure welding;
    forming a first preform (2a) by forming a quenchable part (9a) of a predetermined shape in a region of the second preparatory material (21) of the first material (23), and by forming a first low-carbon steel part (L1) of a predetermined shape in a region of the first preparatory material (20) of the first material (23);

quenching the quenchable part (9a) to form a high-strength part (9);

forming a second preform (2b) having a second low-carbon steel part (L2) of a predetermined shape from a second material (40) made of second low-carbon steel containing less than 0.45% of C; and bonding the first low-carbon steel part (L1) of the first preform (2a) and the second low-carbon steel part (L2) of the second preform (2b) by fusion welding.

8. The method of manufacturing a fusion-bonded product having a high-strength part according to claim 7, wherein the quenchable part (9a) of a predetermined shape is formed by forging.

9. The method of manufacturing a fusion-bonded product having a high-strength part according to claim 8, wherein
the first low-carbon steel part (L1) of a predetermined shape is also formed by forging.

10. The method of manufacturing a fusion-bonded product having a high-strength part according to claim 9, wherein
the second low-carbon steel part (L2) of a predetermined shape is also formed by forging.

11. A fusion-bonded product having a high-strength part, comprising:
a first preform (2a) constituted by (a) integrally, frictionally pressure-welding a first steel part (L1) made of a structured steel containing less than 0.60% of Carbon Equivalent and a quenchable steel part (H) made of another structured steel containing not less than 0.60% of Carbon Equivalent, and (b) deforming the first preform by forging such that a border between the first low-carbon steel part (L1) and the part (H) comprises a V-shaped peak in cross section; and
a second preform (2b) having a second steel part (L2) made of a structured steel containing less than 0.60% of Carbon Equivalent;
wherein the quenchable steel part (H) of the first preform (2a) is provided with a high-strength part (9) that has been previously formed into a desired shape and quenched, the second steel part (L2) of the second preform (2b) has been previously formed into a predetermined shape,
the first steel part (L1) of the first preform (2a) and the second steel part (L2) of the second preform (2b) are bonded to each other by fusion welding and
the quenchable steel part (H) of the first preform is spaced from the second steel part (L2) of the second preform with the first steel part (L1) of the first preform disposed therebetween.

12. The fusion-bonded product having a high-strength part according to claim 11, wherein
the high-strength part (9) has a tooth profile.

13. The fusion-bonded product having a high-strength part according to claim 12, wherein
the first preform (2a) constitutes a first differential case,
the second preform (2b) constitutes a second differential case, and
the first steel part (L1) of the first preform (2a) and the second steel part (L2) of the second preform (2b) are bonded to each other by fusion welding to constitute a differential case (2).

14. The fusion-bonded product having a high-strength part according to claim 11, wherein
the first steel part (L1) and the second steel part (L2) are selected in such a manner that the sum of a value of Hot Crack Sensitivity of the first steel part (L1) and a value of Hot Crack Sensitivity of the second steel part (L2) is less than 7.0.

15. A method of manufacturing the fusion bonded product according to claim 11, the method comprising:
forming an integral first material (23) by frictionally pressure-welding a first preparatory material (20) made of a structured steel containing less than 0.60% of Carbon Equivalent and a second preparatory material (21) made of another structured steel containing not less than 0.60% of Carbon Equivalent;
removing a burr (22) on the first material (23), the burr having been caused by the friction-pressure welding;
forming a first preform (2a) by forming a quenchable part (9a) of a predetermined shape in a region of the second preparatory material (21) of the first material (23), and by forming a first steel part (L1) of a predetermined shape in a region of the first preparatory material (20) of the first material (23);
quenching the quenchable part (9a) to form a high-strength part (9);
forming a second preform (2b) having a second steel part (L2) of a predetermined shape from a second material (40) made of a second structured steel containing less than 0.60% of Carbon Equivalent; and
bonding the first steel part (L1) of the first preform (2a) and the second steel part (L2) of the second preform (2b) by fusion welding.

16. The method of manufacturing a fusion-bonded product having a high-strength part according to claim 15, wherein
the quenchable part (9a) of a predetermined shape is formed by forging.

17. The method of manufacturing a fusion-bonded product having a high-strength part according to claim 16 wherein
the first steel part (L1) of a predetermined shape is also formed by forging.

18. The method of manufacturing a fusion-bonded product having a high-strength part according to claim 17, wherein
the second steel part (L2) of a predetermined shape is also formed by forging.

19. The method of manufacturing a fusion-bonded product having a high-strength part according to claim 15, wherein
the first preparatory material (20) and the second material (40) are selected in such a manner that the sum of a value of Hot Crack Sensitivity of the first preparatory material (20) and a value of Hot Crack Sensitivity of the second material (40) is less than 7.0.

20. A fusion-bonded product comprising:
(a) a first preform comprising a high-carbon steel part (H) containing not less than 0.45% of carbon friction-welded to a first low-carbon steel part (L1) containing less than 0.45% of carbon, wherein the high-carbon steel part (H) comprises a high-strength quenched part and wherein the high-carbon steel part (H) and the first low-carbon steel part (L1) have a border comprising a V-shaped peak in cross section; and
(b) a second preform comprising a second low-carbon steel part (L2) containing less than 0.45% of carbon, the second preform being fusion welded to the first preform, wherein the high-carbon steel part (H) of the first preform is spaced from the second low-carbon steel part (L2) of the second preform with the first low-carbon steel part (L1) of the first preform disposed therebetween.

* * * * *